Aug. 26, 1924.
A. BJÖRKLUND-ASPEREN
DISPLAY HOLDER AND CONTAINER FOR EDUCATIONAL CARDS
Filed Feb. 23, 1923   3 Sheets-Sheet 1

Aug. 26, 1924. 1,506,156
A. BJÖRKLUND-ASPERÉN
DISPLAY HOLDER AND CONTAINER FOR EDUCATIONAL CARDS
Filed Feb. 23, 1923   3 Sheets-Sheet 2

Inventor:
Anna Björklund-Asperén

Aug. 26, 1924.　　　　　　　　　　　　　　　　　1,506,156
A. BJÖRKLUND-ASPERÉN
DISPLAY HOLDER AND CONTAINER FOR EDUCATIONAL CARDS
Filed Feb. 23, 1923　　　3 Sheets-Sheet 3
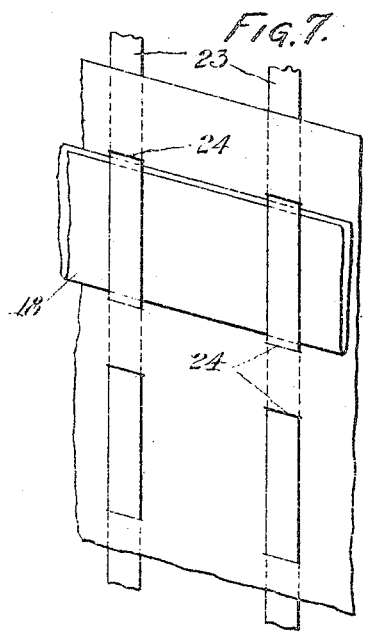
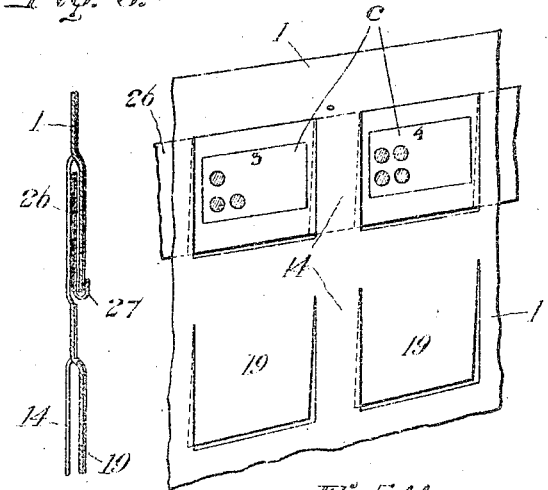
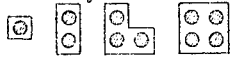
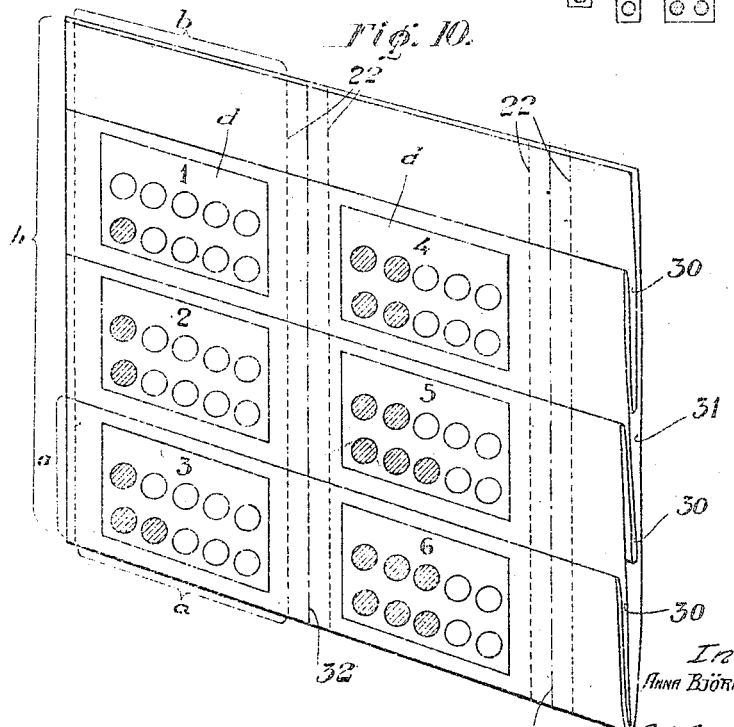
Inventor:
Anna Björklund-Asperén Patented Aug. 26, 1924.

1,506,156

UNITED STATES PATENT OFFICE.

ANNA BJÖRKLUND-ASPERÉN, OF STOCKHOLM, SWEDEN.

DISPLAY HOLDER AND CONTAINER FOR EDUCATIONAL CARDS.

Application filed February 23, 1923. Serial No. 620,761.

*To all whom it may concern:*

Be it known that I, ANNA BJÖRKLUND-ASPERÉN, a subject of the King of Sweden, residing at Ostermalmsgatan 38, Stockholm, Sweden, have invented certain new and useful Improvements in Display Holders and Containers for Educational Cards, of which the following is a specification.

This invention relates to a device for keeping loose letters and the like.

As is well known, the first stage of teaching in the infant school involves the use of loose characters, signs or the like, such as letters, numerals, punctuation marks, arithmetical marks or cards, containing such characters, marks and signs, letter pictures, ciphering pictures etc., the children being taught to combine different words from said characters or cards, to cipher etc.

For keeping characters, boxes of pasteboard or the like have usually been used heretofore, a pasteboard disk provided with holes having been placed in the bottom of said box, such holes forming recesses, one for each character, at the bottom of the box, which recesses have thus received the characters laid therein.

This arrangement, however, is unsatisfactory since the characters are apt to be readily confused on the box being moved about or manipulated, the box being moreover rather inconvenient for the child to carry.

The present invention relates to an arrangement which, without suffering from the said drawbacks, does not only replace the said boxes, but will also serve as an A—B—C book and as an exercise book in reading or in ciphering or both.

This invention is more particularly described with reference to the accompanying drawings, in which:—

Figure 1 shows one form in a plan view.

Figure 2 is a section on the line II—II of Fig. 1.

Figure 4:
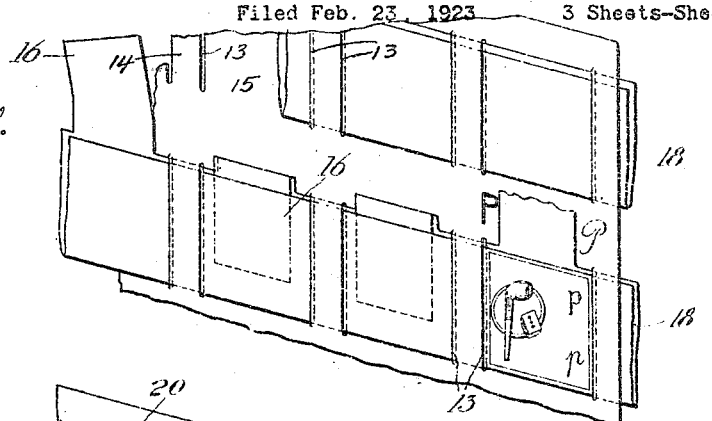

Figure 3ª shows the contrivance in its folded position.

Figure 3ᵇ a modification in folded position.

Figures 4, 5, 6, 7 and 9 and 10 are fragmentary perspective views disclosing a number of further embodiments of the invention. Figure 8 is a vertical section of Fig. 9.

According to Figs. 1 and 2, the arrangement consists of an oblong sheet, or the like made of strong paper, cloth or other suitable material 1, this part of the contrivance being hereafter often referred to as the sheet such sheet being on the one side provided with pockets 2 intended for keeping the loose letters or characters. These pockets are formed of longitudinal paper strips 3 attached to the sheet proper 1 along one of their long edges and along transversal lines situated at a distance from each other corresponding to the width of the pockets. According to Fig. 1 said strips 3 are assumed to be sewn to the sheet, but they may also be pasted or otherwise fastened for instance by steel wire cramps. In Fig. 1, 4 denotes the seam connecting the one longitudinal edge of the strip with the cover, whereas 5 designates seams extending from the bottom edge of the sheet to the top edge thereof thus closing the pockets at the lateral edges. Along the top edge of the sheet there is also a seam 6, so that the whole sheet will be divided in squares of approximately the same size.

The seams along the sheet serve to strengthen the latter.

Each pocket is provided on the outside with a letter picture corresponding to the characters to be kept. Thus, the first pocket intended for the letter A shows an ape, while the second pocket shows berries, and so on. For each pocket, the letter in question is also inserted in printed as well as in written type. The characters as well as the pictures may be either written or printed directly on the sheet or the pockets respectively, or the characters may be put on special slips which are then pasted on to the sheet. Preferably, the small letters are then, as shown in the drawing, disposed on the pocket, while the capital letters are arranged on the free field 11 above the pocket. According to Fig. 1 the letters are arranged on special slips of paper 7 and 8 respectively, which are pasted on to the sheet while the letter pictures are printed direct on the pocket. Thus, a set of slips 7 and 8 belongs, according to Fig. 1, to each sheet or book of the said kind, these slips being gummed on the back and adapted to the size of the pockets or the fields 11; if desired, the pupil may paste the said slips himself in the proper place in accordance with the progress of the tuition.

The sheet is divided into three parts of approximately the same size by means of two transversal folds 9, 10, the said parts being thus laid on top of each other when the sheet is folded.

According to the drawing, the sheet is provided with nine letter columns and with two columns for punctuation marks, which letter columns are each arranged adjacent to one of the folds 9, 10.

It might be more suitable, however, to have all the punctuation marks in a single column to the right, and the distance between the letter columns on either side of the folds in question may then be considerably reduced. A fold is then preferably provided along the inner edge of the column for the punctuation marks, so that this column forms a flap which may be folded in when the sheet is folded.

This flap is designated by 12 in Fig. 3<sup>b</sup>.

In the special squares on the back of the sheet there may be arranged so-called cipher pictures, so that the contrivance may also be used when teaching in ciphering. If desired, pockets may also be provided on the back of the sheet.

If desired the characters on the gummed slips may be cut or stamped in the paper.

If desired, the pockets may be provided with bellows folds adjacent to the edges so that they will be more capacious.

According to Fig. 4, the sheet is provided with cuts 13, extending in the vertical direction of the pockets, said cuts forming in part comparatively narrow laminae 14 and partly wide laminæ 15, the latter corresponding to the width of the pockets. The pockets proper are made of double-folded strips of paper, paste-board or the like 18 inserted from the end of the sheet under the narrow laminæ 14. One of the parts of the double-folded strip, preferably the rear one, is provided, if desired, with tongues 16 adapted to be folded into the pockets in order to form a cover for same. Instead of stamping laminæ in the sheet and threading the double-folded strips under the same, the said strips may be attached in any suitable way to the sheet direct.

Figure 5:
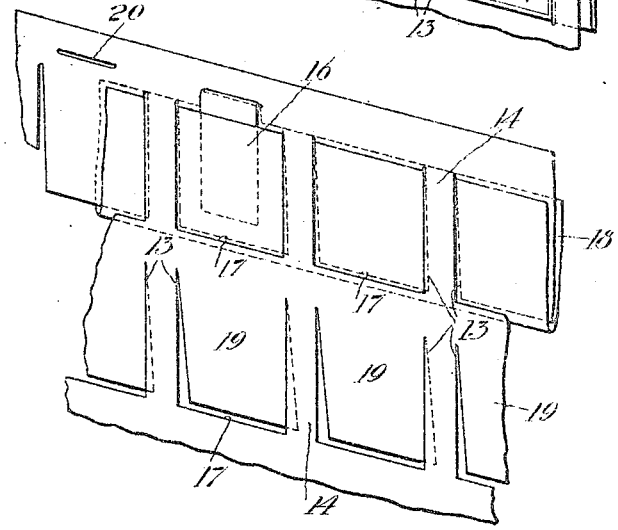

The embodiment disclosed in Fig. 5 differs from Figure 4 only in that cuts 17 have been provided in the sheet also between the laminæ at the lower ends of the latter, as will be clearly seen from the lower portion of the figure where the pocket strip is not shown. By this arrangement it will be possible to put the double-folded strip from below on to the tongues 19 formed by the cuts 13 and 17. If covering tongues 16 are desired in this embodiment in the back porton of the strip, a cut 20 has to be made in the sheet somewhat above each tongue 19, so that said tongue 16 can be passed from the back of the sheet through said cut.

Figure 6:
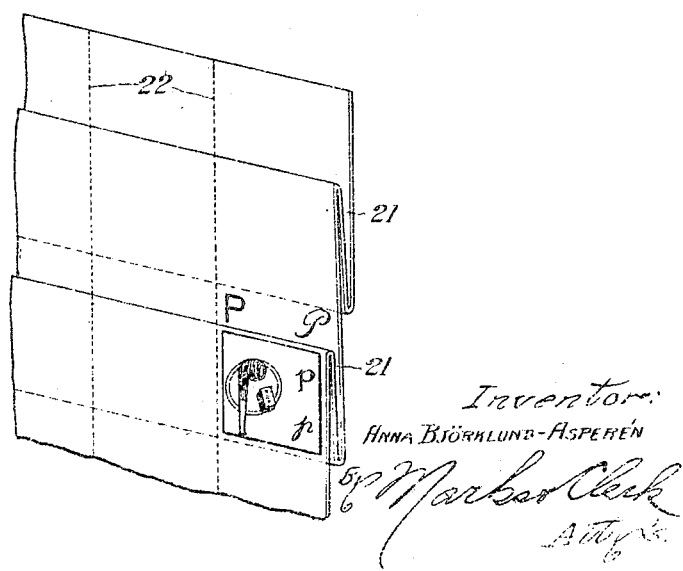

According to Figure 6, the sheet proper is so folded as to form long "pockets" arranged the one above the other. The folds are then united, in that they are sewn, or pasted together by means of strips along the lines indicated by 22, so that every large "pocket" is divided in pockets of the desired size.

According to Figure 7, double-folded strips 18 are used, the same as in Figures 4 and 5, one strip being employed for each horizontal series of pockets, and transversely arranged over these strips are further strips 23 at a mutual distance corresponding to the width of the pockets, said strips 23 being threaded through transversal cuts 24 in the sheet. The arrangement may be modified so that the strips 23 are sewn or pasted fast each in its place. (Likewise, the pockets may be provided with tongues 16, as in Figures 4 and 5.)

According to Figures 8 and 9, a sheet made for instance of tough paper in the manner shown in Figure 5, is provided with tongues 19, cloth being pasted on to the back of the paper. Simple paper strips 26 covered each with cloth on the back are threaded behind the laminæ 14. The paper strip preferably projects with its lower edge past the cloth strip, and this edge 27 is folded behind and pasted to the back of the tongues 19. In such a way, pockets are formed between the strips and the sheet.

In this figure the pockets are provided on their outside with cipher numeral representations c. The representation for numeral 1 consists of one black field, the representation for numeral 2 of two such fields etc.

According to Fig. 10, the device is made of a simple piece of paper or other suitable material which is folded so as to form three horizontally long pockets 30 of relatively small depth and one horizontally long pocket 31 behind the first pockets, said pocket 31 having a greater depth than the others as it extends practically from the upper to the lower edge of the device. These long horizontal pockets 30 and 31 are after the said folding divided into short pockets horizontally counted in that the folds are united, for instance sewn together, along the vertical lines 22, two such seams being provided between two adjacent vertical columns. Each vertical pocket column thus consists of three short and relatively shallow pockets a and of one short and relatively deep pocket b. Of course the sheet or the like can be so folded, that each vertical column consists of two or more shallow front pockets, and one deep pocket behind each vertical series of shallow pockets. According to Fig. 10 the small pockets are provided on the outside with numeral cipher representations d.

It is believed to be most suitable that the capital letters be written or printed directly on the sheet above the pockets, as shown in Fig. 4, while the letter picture with the letter pertaining thereto is applied to one and the same slip which is pasted on to the pocket in question.

If the pupil is then given a sheet with pockets arranged thereon and with letters above the same, he may himself cut out the separate slips from a chart containing all the letter pictures with the small letters pertaining thereto, and then paste the said slips in their proper places, and he may also cut out the small letter cards from one or more charts containing the alphabet, and place the cards in the proper pockets.

These representations are all provided with ten small (preferably circular) fields. The representation for the representation corresponding to numeral 1 has one field filled in with black or other colour, the representation for numeral 2 has two black fields etc.

The sheet according to Fig. 10 is preferably provided with twelve small front pockets a, arranged in four vertical series. The eleventh pocket is for the zero-representation and the twelfth one for arithmetical signs. Thus there are four rear pockets b, one for each series. The whole sheet is folded into three transversal folds 32, that is one fold is provided between the two seams in each seam pair 22, so that four pocket panels are formed. Of course the device can if desired be provided with only one vertical fold in the middle, so that only two panels are formed.

The front pockets a are adapted to contain loose numerals or numeral cards, arithmetical signs, numeral representations of the same appearance as c, d or such numeral representations as shown in Fig. 11 etc. The deep rear pockets are adapted to contain greater numeral representations, board pieces etc.

The numeral representations can be printed directly on the pockets or they can be printed, as shown in the drawing, on special loose pieces of paper, being gummed on the one side. The several embodiments shown can also be provided with so many pockets, that they can serve both as "spelling book" and as "ciphering book."

As shown in Figs. 4 and 5, tongues 16 may be provided in all embodiments, such tongues forming covers for the pockets.

All the embodiments shown may be covered on the back either by paper or by cloth or both.

If desired, the front side may be made of cloth covered with paper on the back.

In all instances where two or more parts of the contrivance laid on top of each other are to be fastened together, this may be effected by sewing, pasting, or by means of cramps of any kind, and so forth. The embodiments according to Figures 4–10 can preferably be made in a bindery.

Obviously, the contrivance may also be made as an ordinary book with one or more leaves, the covers, leaves or both being provided with pockets etc. of the above description.

What I claim as new and desire to secure by Letters Patent of the United States of America is:—

1. A device for keeping loose characters, and for serving as an exercise book for teaching in the infant school consisting of a sheet of a suitable material provided on one side with a number of pockets for keeping such characters and adapted to be folded into a size corresponding to the size of a text book, the pockets having been formed by firstly folding the sheet so as to form long horizontal pockets, situated the one above the other, and then dividing said horizontal long pockets vertically so as to form pockets of the desired size.

2. A device for keeping loose characters, and for serving as an exercise book for teaching in the infant school consisting of a sheet of a suitable material provided on one side with a number of pockets for keeping such characters and adapted to be folded into a size corresponding to the size of a text book, the pockets having been formed by firstly folding the sheet so as to form long horizontal pockets, situated the one above the other, and then dividing said horizontal long pockets vertically so as to form pockets of the desired size, said dividing of the long pockets being made by means of vertical seams.

3. A device for keeping loose letters, and for serving as an exercise book for teaching in the infant school consisting of a sheet of a suitable material provided on one side with a number of pockets for keeping such letters and adapted to be folded into a size corresponding to the size of a text book, the pockets for keeping of such letters being provided on their outside with letter pictures corresponding to the letters to be kept in the pockets.

4. A device for keeping loose characters, and for serving as an exercise book for teaching in the infant school consisting of a sheet of a suitable material provided on one side with a number of pockets for keeping such characters and adapted to be folded into a size corresponding to the size of a text book, the pockets for keeping of such characters being provided on their outside with pictures corresponding to the characters to be kept in the pockets, the pockets being arranged in horizontal series, arranged the one above the other.

5. A device for keeping loose characters, and for serving as an exercise book for teaching in the infant school consisting of a sheet of a suitable material provided on one side with a number of pockets for keeping such characters and adapted to be folded into a size corresponding to the size of a text book, the pockets for keeping of such characters being provided on their outside with pictures corresponding to the characters to be kept in the pockets, the pockets being arranged in horizontal series, arranged the one above the other, the sheet being provided with free fields above the pockets, characters corresponding to the characters in the adjacent pockets being arranged in said free fields.

6. A device for keeping loose letters, and for serving as an exercise book for teaching in the infant school consisting of a sheet of a suitable material provided on one side with a number of pockets for keeping such letters and adapted to be folded into a size corresponding to the size of a text book, the pockets for keeping of such letters having attached to their outside pieces of paper, containing letter pictures corresponding to the letters to be kept in the pockets.

7. A device for keeping loose letters, and for serving as an exercise book for teaching in the infant school consisting of a sheet of a suitable material provided on one side with a number of pockets for keeping such letters and adapted to be folded into a size corresponding to the size of a text book, the pockets for keeping of such letters having attached to their outside pieces of paper, containing pictures corresponding to the characters to be kept in the pockets, the pockets being arranged in horizontal series, arranged the one above the other.

8. A device for keeping loose characters, and for serving as an exercise book for teaching in the infant school consisting of a sheet of a suitable material provided on one side with a number of pockets for keeping such characters and adapted to be folded into a size corresponding to the size of a text book, the pockets having been formed by first folding the sheet so as to form long horizontal pockets, situated the one above the other, and then dividing said horizontal long pockets vertically so as to form pockets of the desired size, the pockets having attached to their outside pieces of paper, containing pictures corresponding to the characters to be kept in the pockets, the pockets being arranged in horizontal series, arranged the one above the other.

In testimony whereof I affix my signature in presence of two witnesses.

ANNA BJÖRKLUND-ASPERÉN.

Witnesses:
  ERIC HOLGER,
  L. BERG v SINOLE.